(12) United States Patent
Eftekhari Far et al.

(10) Patent No.: US 10,317,550 B2
(45) Date of Patent: Jun. 11, 2019

(54) FRACTURE AND STRESS CHARACTERIZATION USING LAYER THICKNESS VARIATION

(71) Applicant: Halliburton Energy Services, Inc., Houston, TX (US)

(72) Inventors: Mehdi Eftekhari Far, Humble, TX (US); Natasa Mekic, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/512,416

(22) PCT Filed: Apr. 19, 2016

(86) PCT No.: PCT/US2016/028294
§ 371 (c)(1),
(2) Date: Mar. 17, 2017

(87) PCT Pub. No.: WO2017/184123
PCT Pub. Date: Oct. 26, 2017

(65) Prior Publication Data
US 2018/0172859 A1    Jun. 21, 2018

(51) Int. Cl.
*G01V 1/30* (2006.01)
*G01V 1/42* (2006.01)
*G01V 99/00* (2009.01)

(52) U.S. Cl.
CPC .............. *G01V 1/307* (2013.01); *G01V 1/306* (2013.01); *G01V 1/308* (2013.01); *G01V 1/42* (2013.01);
(Continued)

(58) Field of Classification Search
CPC ........ G01V 1/307; G01V 1/306; G01V 1/308; G01V 1/42; G01V 99/005
(Continued)

(56) References Cited

U.S. PATENT DOCUMENTS 6,714,873 B2 * 3/2004 Bakulin .................. G01V 1/30
702/14
6,985,405 B2 * 1/2006 Ren ........................ G01V 1/284
367/50
(Continued)

FOREIGN PATENT DOCUMENTS

EP          0169076 B1     1/1991
WO       2015006363 A1     1/2015

OTHER PUBLICATIONS

Fomel, Predictive Painting of 3_D seismic volumes, 2010.*
International Search Report and Written Opinion dated Jan. 16, 2017; International PCT Application No. PCT/US2016/028294.

*Primary Examiner* — Michael P Nghiem
*Assistant Examiner* — Dacthang P Ngo
(74) *Attorney, Agent, or Firm* — McGuireWoods LLP (57) ABSTRACT

Disclosed herein are embodiments of systems, methods, and computer program products for determining fracture and stress characterization using layer thickness variation over an azimuthally anisotropic medium, which may include one or more of the following functions: acquiring seismic data by recording reflected seismic waves in at least two directions; sorting of the seismic data so that offset is zero at a center and increases radially from a single common-point (CMP) gather for a plurality of data points; generating a multi-dimensional volume by juxtaposing a set of common-offset sections by one of their common-depth point (CDP) and CMP locations; selecting reflectors for each layer in the one of the multi-dimensional volume; computing layer parameters including effective anisotropy and interval anisotropy for each layer in the multi-dimensional volume based on a geometry of the reflectors selected for each layer in the multi-dimensional volume; and applying the layer parameters to an earth model.

20 Claims, 8 Drawing Sheets

(52) U.S. Cl.
CPC .... *G01V 99/005* (2013.01); *G01V 2210/1295* (2013.01); *G01V 2210/1299* (2013.01); *G01V 2210/161* (2013.01); *G01V 2210/612* (2013.01); *G01V 2210/6222* (2013.01); *G01V 2210/646* (2013.01); *G01V 2210/74* (2013.01)

(58) Field of Classification Search
USPC .......................................................... 702/14
See application file for complete search history.

(56) References Cited

U.S. PATENT DOCUMENTS

| | | |
|---|---|---|
| 2004/0117121 A1 | 6/2004 | Gray et al. |
| 2010/0133010 A1* | 6/2010 | Blias ................... G01V 1/42 175/50 |
| 2010/0183198 A1 | 7/2010 | Marmal et al. |
| 2010/0312534 A1 | 12/2010 | Xu et al. |

* cited by examiner

FRACTURE AND STRESS CHARACTERIZATION USING LAYER THICKNESS VARIATION

BACKGROUND

The present disclosure relates to oil and gas exploration and production, and more particularly to systems and methods for characterization of natural and hydraulic fractures and stress using layer thickness variation over an azimuthally anisotropic medium.

In order to study and understand the complex Earth, exploration geophysicists make many assumptions. One of them is that the earth is perfectly isotropic when it is fundamentally anisotropic. Anisotropy is the property of being directionally dependent. In other words, various layers of the Earth exhibit properties with different values when measured in different directions or azimuths. Azimuthal seismic anisotropy can be caused by different factors such as regional stress, rock fabric and vertical fractures. Commonly, a combination of above factors causes azimuthal anisotropy, making it a challenging problem for fracture and geomechanics applications.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, and electrical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity. In addition, as used herein, the singular forms "a", "an" and "the" are intended to include the plural forms as well, unless the context clearly indicates otherwise.

Unless otherwise specified, any use of any form of the terms "connect," "engage," "couple," "attach," or any other term describing an interaction between elements is not meant to limit the interaction to direct interaction between the elements and may also include indirect interaction between the elements described.

The following written description discloses a novel approach to characterization of fracture and stress using layer thickness variation over an azimuthally anisotropic medium by recognizing that seismic waves recorded at different azimuths will identify subsurface layers with different thicknesses. In one embodiment, in order to compute thickness attributes, the disclosed embodiments are configured to determine seismic reflectors' travel times. For example, in one embodiment, the disclosed embodiments are configured to accurately pick seismic reflectors in pre-stack multi azimuth data as the effect of seismic anisotropy on travel time is second order. For instance, in one embodiment, the disclosed embodiments may utilize predictive painting using plane wave destruction, as known to one ordinary skill in the art, to accurately pick the seismic reflectors. Predictive painting has been shown to effectively be able to automatically pick reflectors in pre-stack seismic data. Plane wave destruction has been shown to effectively be able to automatically pick seismic reflectors, perform flattening of seismic data, and compute layer thickness attributes from time shift cubes. The disclosed system and methods provide attributes which give a measure of magnitude and direction of azimuthal anisotropy as well as interval attributes.

Figure 1:
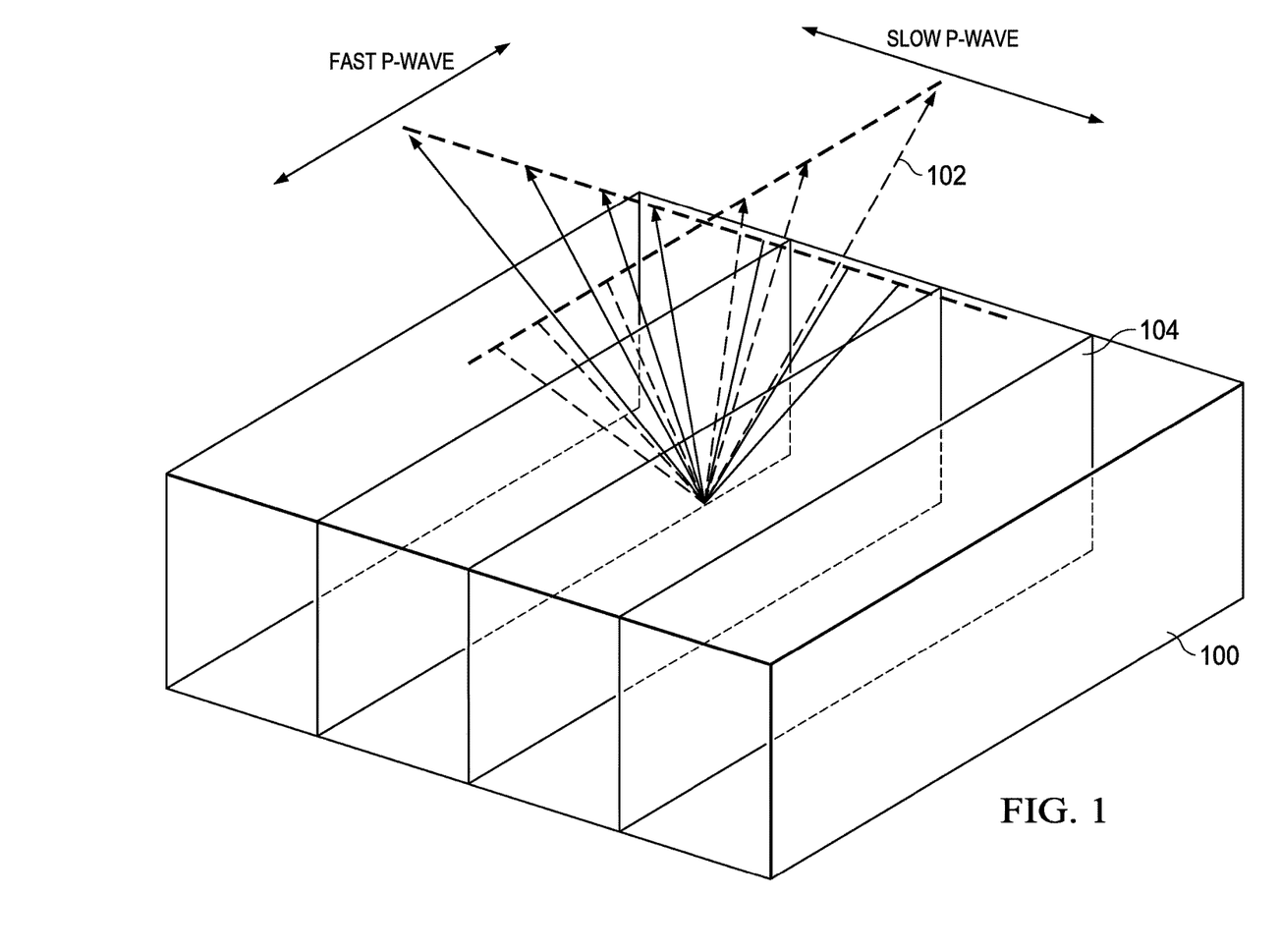
FIG. 1 is a diagram depicting an example of azimuthally anisotropic medium in which seismic waves will travel faster parallel to fractures and slower in direction perpendicular to the fractures.

Referring now to the drawings, FIG. 1 is a diagram depicting an example of an azimuthally anisotropic medium 100 (e.g., an isotropic medium with one dominant set of vertical fractures) in which seismic waves 102 will travel faster parallel to fractures 104 and slower in direction perpendicular to the fractures 104. Thus, in accordance with the disclosed embodiments, if seismic waves 102 are recorded in different orientations, a subsurface layer will appear with different thicknesses in different azimuths.

Figure 2:
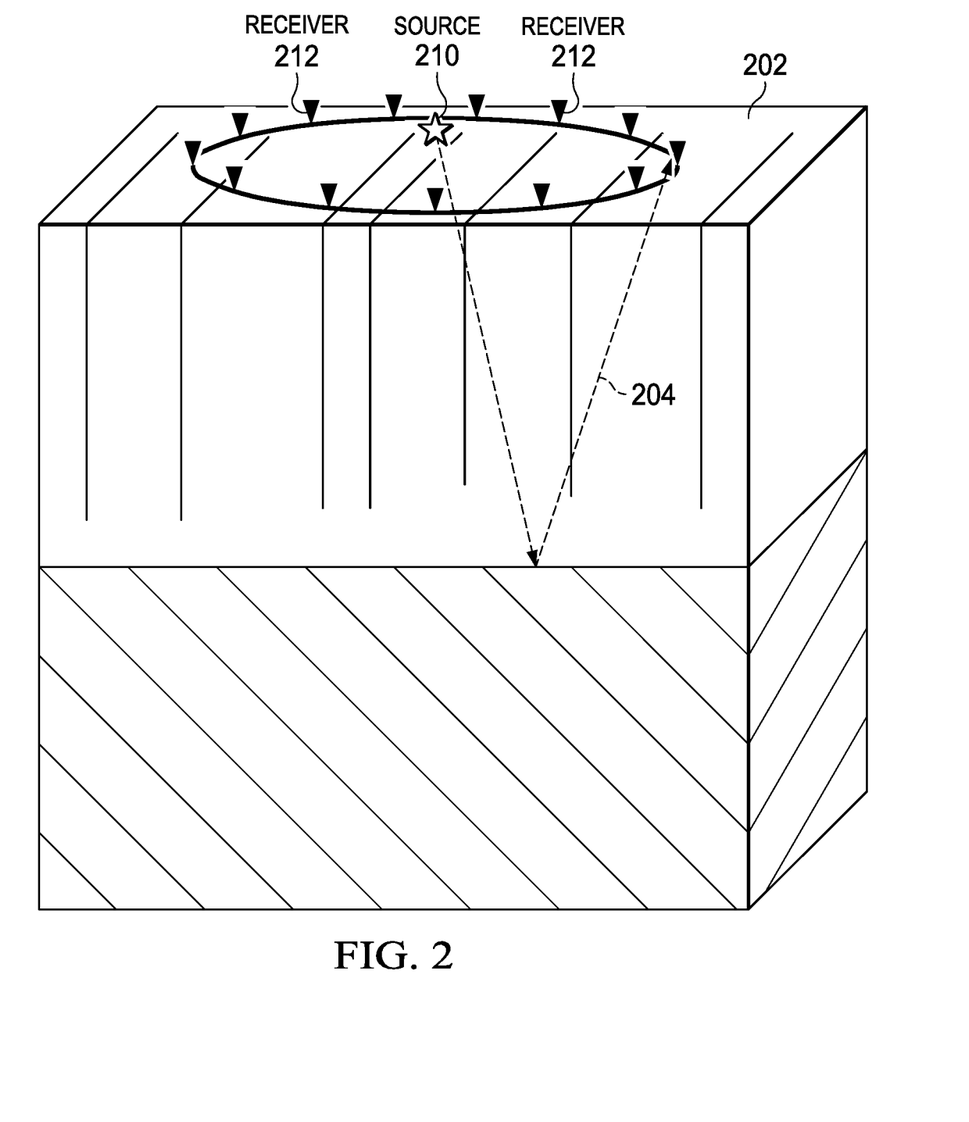
FIG. 2 is a diagram depicting an example of a reflected wave recording in an azimuthally anisotropic medium.

For example, FIG. 2 is a diagram depicting an example of a reflected wave 204 recording in an azimuthally anisotropic medium 202. In particular, FIG. 2 shows an example for surface seismic applications where the source 210 is assumed to be in the middle (shown by a star) and receivers 212 are at the same offset. Offset is defined as the distance between the source 210 and the receiver 212. The actual acquisition for surface seismic applications does not have to be necessarily as shown in FIG. 2. For example, more common acquisition patterns such as orthogonal geometry can be used to acquire the data, and then the data is "sorted" to geometries such as, but not limited to, the one shown in FIG. 2.

Figure 3A:
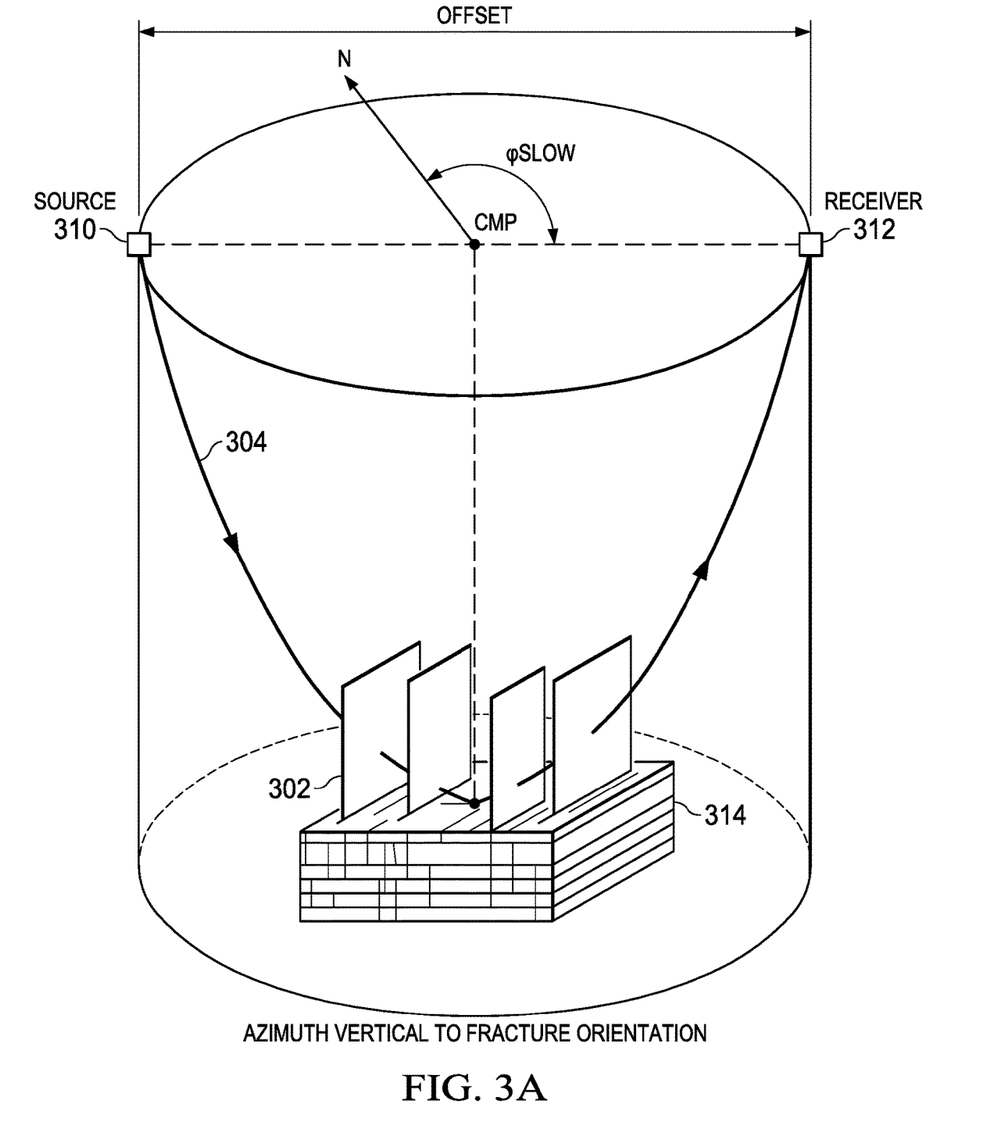
FIGS. 3A and 3B are diagrams depicting an example of seismic data acquisition and wave propagation between the source and receiver over an azimuthally anisotropic medium which can be overlain by other layers that may not be anisotropic.
Figure 3B:
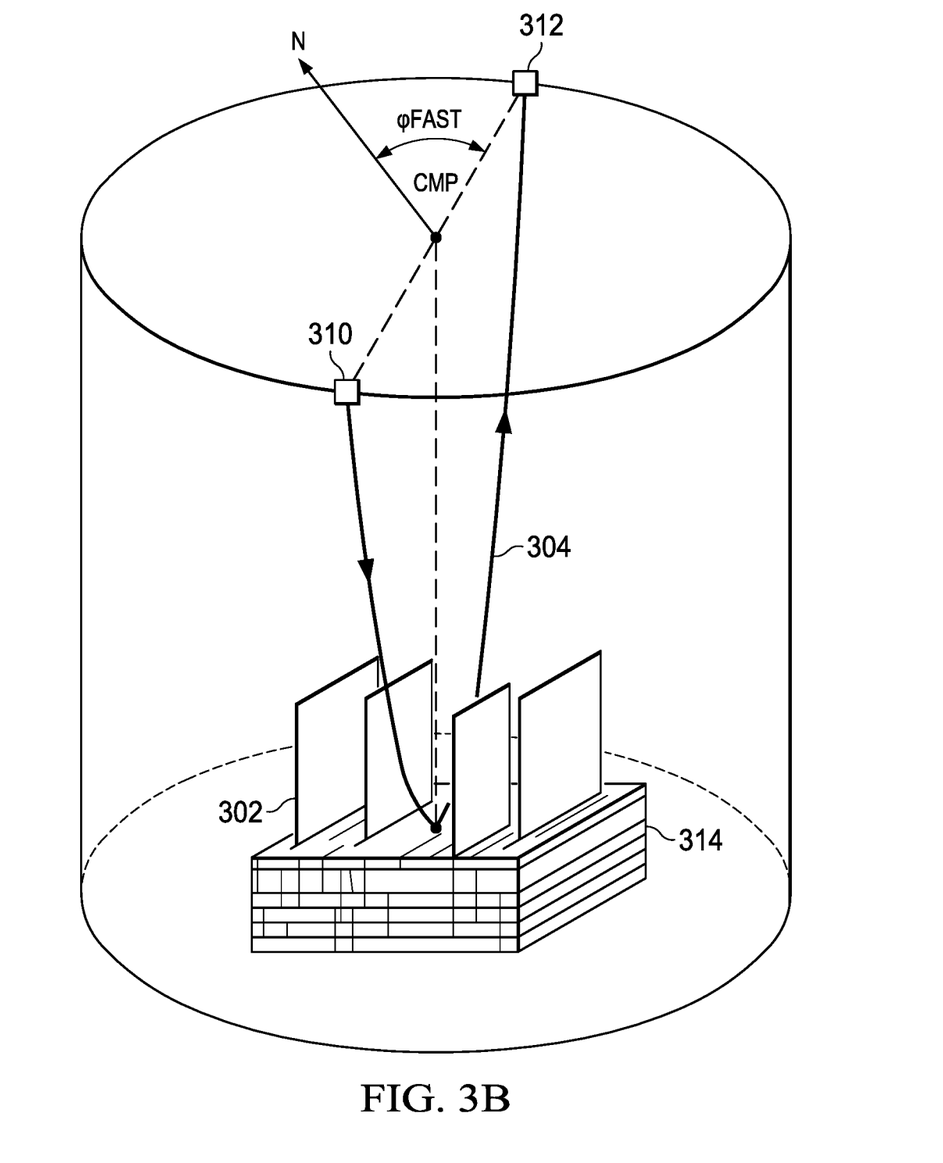

FIGS. 3A and 3B are diagrams depicting an example of seismic data acquisition and wave propagation between the source 310 and receiver 312 over an azimuthally anisotropic medium 314. The azimuthally anisotropic medium 314 may be overlain by other layers that may not be anisotropic. As depicted in the diagrams, recording of reflected seismic waves 304 over the azimuthally anisotropic medium 314 is performed in two directions. As shown in FIG. 3A, when azimuth is perpendicular to the fracture 302 orientation, seismic waves 304 cross the maximum number of fractures 302, thus causing the seismic waves 304 to slow down the most and producing the longest travel times. In contrast, when azimuth is parallel to the fracture 302 orientation, as depicted in FIG. 3B, seismic waves 304 encounter the least number of fractures 302, thus traveling the fastest and producing the shortest travel times.

Figure 4:
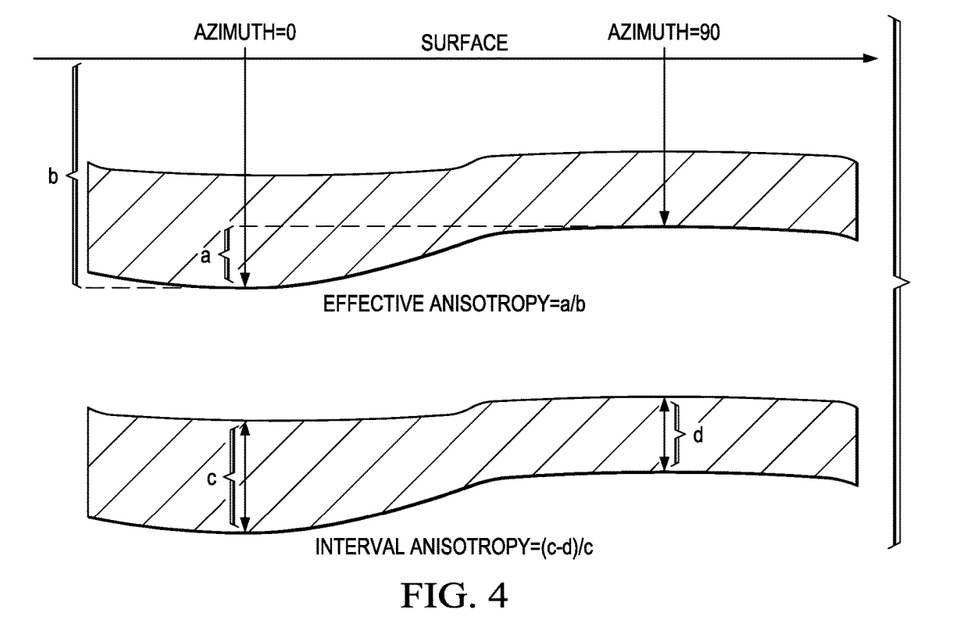
FIG. 4 is a diagram depicting an example of thickness and total travel time variation for a single subsurface layer in an azimuthally anisotropic medium.

FIG. 4 is a diagram depicting an example of thickness and total travel time variation for a single subsurface layer in an azimuthally anisotropic medium. As shown in FIG. 4, in an azimuthally anisotropic medium, the total travel times from the top or base of layers will be different for different azimuths. For example, FIG. 4 shows a schematic view of how a single layer should be seen (vertical cross-section) in an azimuthally anisotropic medium. FIG. 4 is assumed to be at a fixed far offset but with variable azimuth. The disclosed embodiments utilize the far offset because azimuthal changes in travel times will be more evident at far offset and minimal azimuthal anomaly is generally seen at zero offset.

Additionally, FIG. 4 illustrates and defines effective and interval azimuthal anisotropies as shown in FIG. 4. As depicted in the diagram, effective azimuthal anisotropy is defined as a/b, where a is travel time to a base of a layer at azimuth=0 minus (−) travel time to the base of the layer at azimuth=90; and b is travel time to the base of the layer at azimuth=0. Interval azimuthal anisotropy is defined as (c−d)/c, where d is travel time to a base of a layer at azimuth=90 minus (−) travel time to a top of the layer at azimuth=90; and c is travel time to the base of the layer at azimuth=0 minus (−) travel time to the top of the layer at azimuth=0. Fast (and slow) directions based on interval and effective anisotropies are where minimum (and maximum) thicknesses and total travel times are observed. For instance, the azimuth where the global maximum in total travel time for the individual layer is observed is the slow direction. The azimuth where the global minimum in total travel time for the individual layer is observed is the fast direction. The azimuth where the thickness is minimum corresponds to the fast directions for the interval anisotropy analysis. The azimuth where the thickness is maximum corresponds to the slow directions for the interval anisotropy analysis. In some embodiments, fast and slow directions obtained from interval and effective anisotropy measurements can be different.

Such an observation can be seen, for instance, when maximum horizontal stress orientation changes after natural fractures are created.

Figure 5A:
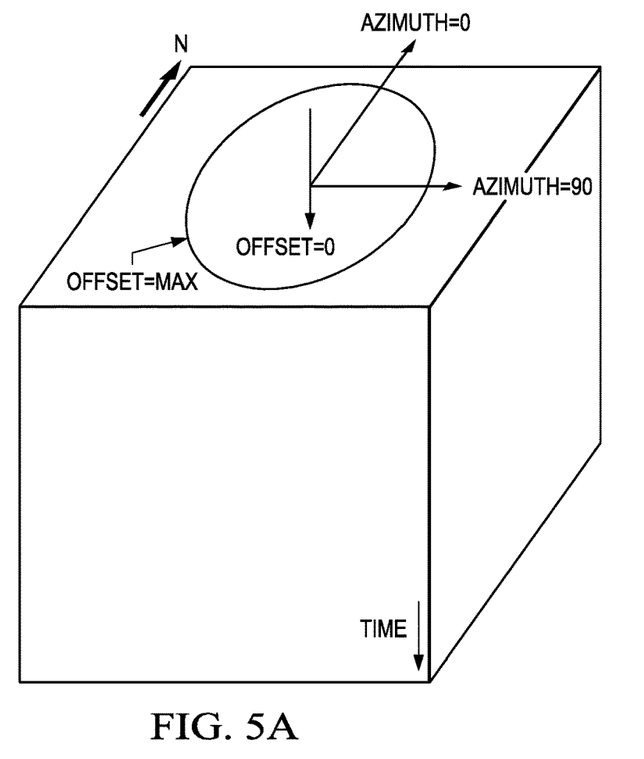
FIG. 5A is a diagram depicting an example of a schematic view of a single common-mid-point (CMP) gather after being sorted in a way that offset is zero at the center and increases radially.

FIG. 5A depicts a schematic view of a single common-mid-point (CMP) gather after being sorted such that offset is zero at the center and increases radially. Azimuth is changing rotationally. In order to make analysis time efficient and at the same time use the most informative part of the data, in one embodiment, the process is configured to select data at a fixed offset with a circle from each CMP gather for the analysis as shown in FIG. 5A. In the depicted embodiment, the selection of circle is just for reducing the computation time. The disclosed embodiments are not limited to selecting data along a circle. Any shape or method may be used in sorting the data.

Figure 5B:
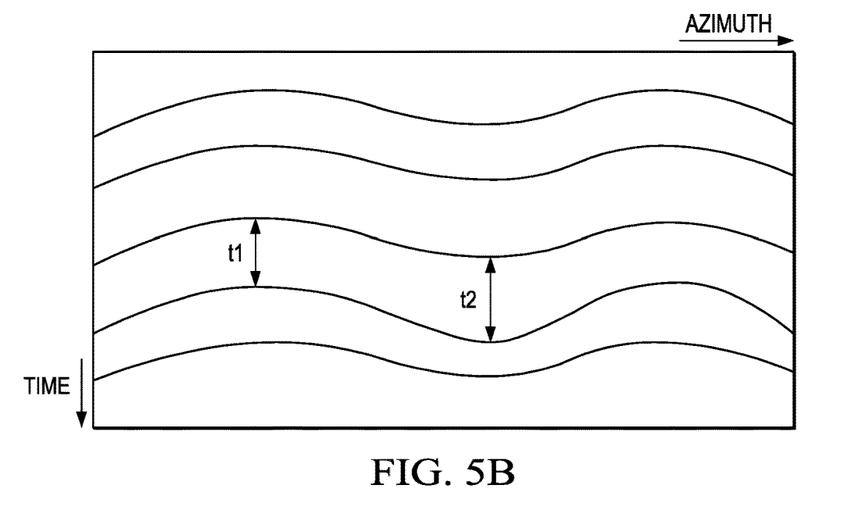
FIG. 5B is a diagram depicting an example of the data along the circle in FIG. 5A which has been opened to be displayed in a two-dimensional (2D) view.

FIG. 5B is a diagram depicting an example of the data along the circle in FIG. 5A which has been extracted/opened to be displayed in a two-dimensional (2D) view. As discussed above, other shapes or methods may be employed in the sorting and extraction process. To increase signal to noise ratio (S/N), each picked data point shown in FIG. 5B can be stacked by its nearest neighbors. Therefore, a 2D common-offset section can be extracted from each CMP gather. If the extracted 2D sections are arranged by their common-depth point (CDP) locations, they form a 3D cube. However, in some embodiments, no data extraction step is performed or needed such as the case when there is enough computing power to process the entire data set within a reasonable time frame. In such embodiments, the entire data in FIG. 5A can be used without removing or reducing the data set.

Figure 6:
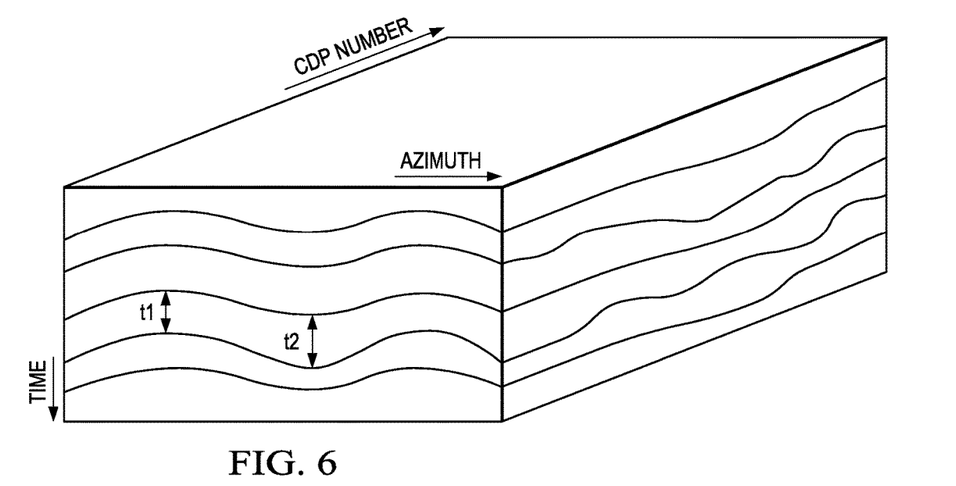
FIG. 6 is a diagram depicting an example of a three-dimensional (3D) volume generated by juxtaposing common-offset sections.

FIG. 6 is a diagram depicting a 3D volume generated by juxtaposing common-offset sections. In one embodiment, an automatic picking tool such as, but not limited to, predictive painting is used for picking the layers (reflectors) in this 3D volume. Having the geometry of the reflectors, for each layer, the process computes the parameters introduced in FIG. 4 (effective and interval anisotropy). Also by having the reflectors geometries, in certain embodiments, the fast and slow directions (which are interpreted as the fracture strikes or maximum/minimum horizontal stresses directions) can be determined. These parameters (computed for each layer) can be applied to a 3D earth model by projecting onto the post-stack section that represents the actual locations and shapes of the underground structures. Therefore 3D volumes of the "attributes" that show the fracture or horizontal stress anisotropy magnitude and fracture/stress direction can be generated in the actual earth coordinates.

In an alternative embodiment, after picking the reflectors in FIG. 6 and computing the anisotropy, the process is configured to project the computations to the right side of FIG. 6 which shows the real earth structures. Therefore in real earth coordinates, FIG. 6 shows data along a straight line and it is a 2D section. Alternatively, in certain embodiments, for 3D seismic data where data is not just along a straight line but everywhere, FIG. 6 will be a 4D volume. In these embodiments, data for each 2D section is processed, which becomes 3D in FIG. 6 domain, and then all the results are merged to get the 3D earth volume.

Figure 7:
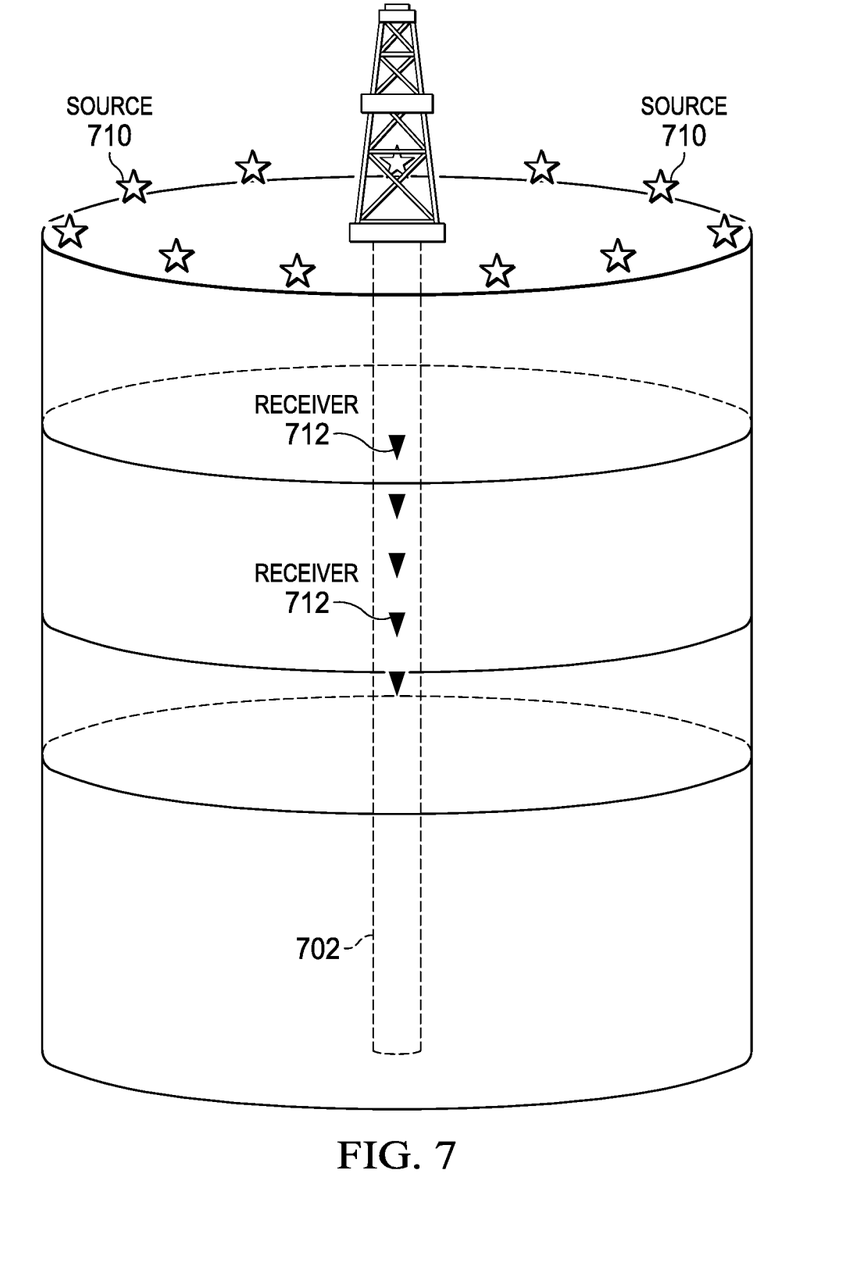
FIG. 7 is a diagram depicting an example of a schematic view of a walk-around VSP for acquiring seismic data.

The disclosed embodiments may be used with any seismic profiling method that is able to capture a thickness of earth layers with variable azimuths such as, but not limited to, surface seismic profiling and vertical seismic profiling (VSP). Vertical seismic profiling is a method for recording seismic waves in the wellbore with higher resolution than the surface seismic. In order for the method described in this disclosure to be used in VSP, the process requires azimuthal coverage. This type of VSP acquisition is depicted in FIG. 7 and is called the "walk-around VSP". In walk-around VSP, seismic waves are generated at the surface by sources 710 which are around the wellbore 720 at the same distance and recorded at the receivers 712 downhole. Additionally, in accordance with the disclosed embodiments, the concept of thickness variation can be used for any other seismic method that can record layer thicknesses as a function of azimuth.

Figure 8:
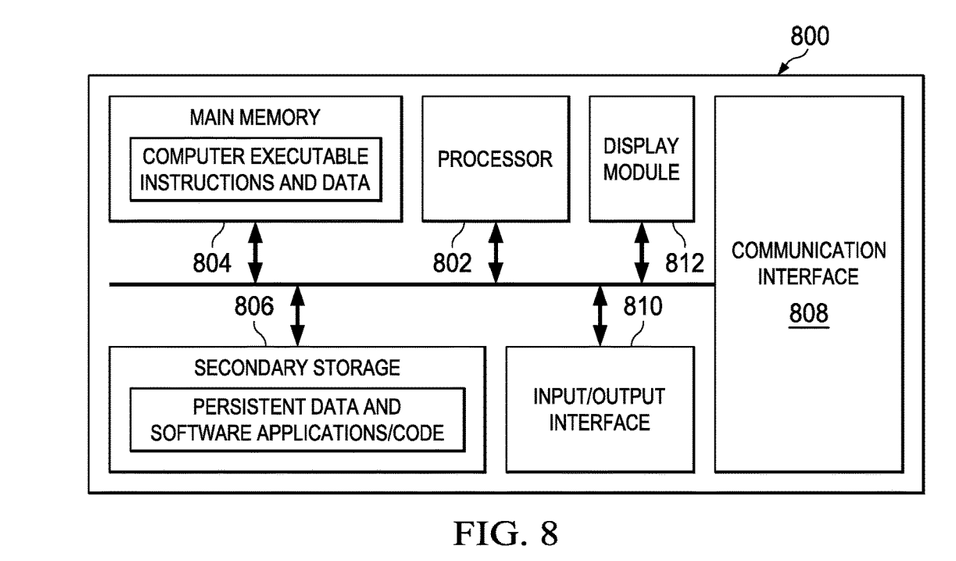
FIG. 8 illustrates a schematic diagram of a system that may be used for characterizing fractures and stress using layer thickness variation over an azimuthally anisotropic medium according to a one embodiment.

FIG. 8 is a schematic diagram illustrating a system 800 that may be used for characterization of natural and hydraulic fracture and stress using layer thickness variation over an azimuthally anisotropic medium according to an exemplary embodiment. The system 800 may be located at the well site or located off-site of a drilling site.

In the depicted embodiment, the system 800 includes, among other components, a processor 802, main memory 804, secondary storage unit 806, an input/output interface module 810, and a communication interface module 808. The processor 802 may be any number of or type of processors capable of executing instructions for performing the features and functions of the disclosed embodiments.

The input/output interface module 810 enables the system 800 to receive user input (e.g., keyboard, mouse, touchscreen) and output information to one or more devices such as, but not limited to, printers, an external data storage drive, and audio and video components.

The communication interface module 808 enables the system 800 to communicate data with other devices over a public or private, wired or wireless network. Non-limiting examples of communication types that may be employed include, but not limited to, near field communication, Wi-Fi communication, cellular data communication, or Ethernet communication. For example, in one embodiment, the system 800 may communicate with the receivers over a secured wireless communication channel to receive seismic data. In some embodiments, communication between the system 800 and other devices may utilize, but not limited to, a local area network, a wide area network, or the Internet.

The system 800 may optionally include a graphics or display module 812 to enable information to be displayed on an internal or external display device. For instance, the display module 812 may include instructions or hardware for providing touchscreen capabilities for receiving user input via the display device. In certain embodiments, the display module 812 may also include instructions for enabling multi-touch functionalities associated with a display device. In some embodiments, the display module 812 may include its own graphics processor for the processing and rendering of images or videos.

Main memory 804 is volatile memory that stores currently executing or prefetched instructions/data for execution by the processor 802. Secondary storage unit 806 is non-volatile memory. Examples of secondary storage unit 806 may include any type of data storage component such as a hard drive, a flash drive, or memory card. The secondary storage unit 806 is configured to store persistent data such as, but not limited to, computer executable instructions associated with software applications or an operating system. These instructions are passed from the secondary storage unit 806 to main memory 804 for enabling execution by the processor 802.

Figure 9:
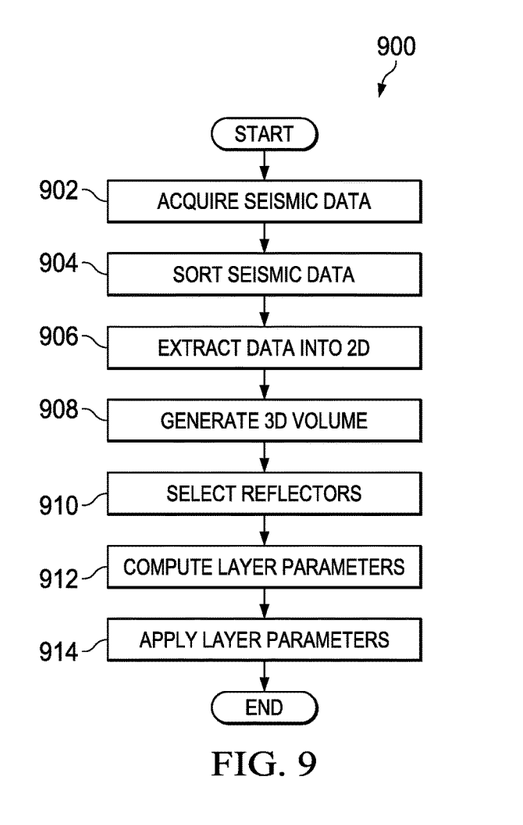
FIG. 9 is a flowchart illustrating a process or algorithm to characterize fracture and stress using layer thickness variation over an azimuthally anisotropic medium in accordance with a disclosed embodiment.

As an example, in one embodiment, the system 800 is configured to execute a program, script, or algorithm to characterize natural and hydraulic fracture and stress using layer thickness variation over an azimuthally anisotropic medium in accordance with the example flowchart shown in FIG. 9. In the depicted embodiment, the process 900 starts at step 902 by acquiring seismic data by recording reflected seismic waves in at least two directions. As stated above, this may be performed using any seismic profiling method that is able to capture a thickness of earth layers with variable azimuths such as, but not limited to, surface seismic profiling and walk-around vertical seismic profiling.

At step 904, the process sorts the seismic data so that offset is zero at a center and increases radially from a single common-mid-point (CMP) gather for a plurality of data points. For example, in one embodiment, the process may be configured to increase radially in a circle, half circle, ellipse, square, rectangle, triangle, or by any other shape or method to the outer limit.

In one embodiment, the process, at step 906, then extracts the data along the circle, or other selected shape, from each of the single CMP gather to generate a set of two-dimensional (2D) common-offset sections for the plurality of data points. Alternatively, in some embodiments, the process may bypass the extraction step and process the entire data set.

At step 908, the process generates a multi-dimensional volume. For example, in one embodiment, the process may be configured to generate a three-dimensional (3D) volume by juxtaposing the set of (2D) common-offset sections by their common-depth point (CDP) locations. In another embodiment, the process may be configured to generate a four-dimensional (4D) volume if the post-stack seismic data, which is in real earth coordinates, is three-dimensional.

The process then selects reflectors for each layer in the 3D volume or 4D volume at step 910. In certain embodiments, this may be performed using any automatic edge detection method such as, but not limited to, predictive painting using plane wave destruction. Still, in certain embodiments, reflectors for each layer in the multi-dimensional volume can be selected manually.

At step 912, the process computes layer parameters including effective anisotropy and interval anisotropy for each layer in the multi-dimensional volume based on a geometry of the reflectors selected for each layer in the multi-dimensional volume. In some embodiments, the step of computing layer parameters includes determining maximum and minimum horizontal stresses directions based on the reflectors geometries, as well as natural or hydraulic induced fractures. Also, in some embodiments, the magnitude of anisotropy caused by either fractures or stress differences is characterized.

In one embodiment, the process, at step 914, applies the layer parameters to a 3D earth model. This may include generating 3D volumes depicting a horizontal stress anisotropy magnitude and stress direction, as well as vertical fracture density and direction in actual earth coordinates in the 3D earth model.

In addition to the disclosed methods and systems, the disclosed embodiments may also be embodied in a computer program product, comprising a non-transitory computer usable medium having a computer readable program code embodied therein.

The disclosed embodiments provide several technical advantages over current technology. For example, currently, nobody has used the concept of layer thickness variation in the pre-stack seismic domain for fracture and stress anisotropy analysis. Previous attempts have been based on analyzing the total travel time from surface to the top/base of each layer. Then a method called "layer-stripping" is used to obtain the interval properties by removing the effects of the layers above the target layer one by one. In addition to being time consuming, layer stripping requires knowledge of the properties of the layers above as well. Therefore, there are significant errors involved in removing the effects of overlaying layers. As a result of stacking the errors in all the individual layers, very large errors will be involved in evaluating the properties of the target layer. The disclosed embodiments do not suffer from these issues.

Accordingly, it should be apparent from the foregoing that embodiments of an invention having significant advantages have been provided. While the embodiments are shown in only a few forms, the embodiments are not limited but are susceptible to various changes and modifications without departing from the spirit thereof.

Further, the steps of the methods described herein may be carried out in any suitable order, or simultaneously where appropriate. Thus, the scope of the claims should not necessarily be limited by the above description, which is merely provided as examples to enable one of ordinary skill in the art to practice the appended claims.

Moreover, while the appended claims recite specific combinations of features of the disclosed embodiments, other combinations of the claims may include one or more of the disclosed features combined in any number of combinations. In other words, it is intended that the disclosed embodiments support amendments to the appended claims or new claims that combine or omit various steps or features of the disclosed embodiments in any combination other than those specifically recited in the current appended claims. For example, the inventions disclosed herein include, but are not limited to the following embodiments.

Example Embodiments

A method, system, and/or computer program product for characterization of natural and hydraulic fractures and stress using layer thickness variation over an azimuthally anisotropic medium, the method, system, and/or computer program product comprising instructions that are configured to perform one or more of the following clauses or portions thereof:

Clause 1: acquiring seismic data by recording reflected seismic waves in at least two directions, wherein the step of acquiring seismic data is performed using any seismic profiling method that is able to capture a thickness of earth layers with variable azimuths including, but not limited to, surface seismic profiling and walk-around vertical seismic profiling (VSP).

Clause 2: sorting of the seismic data so that offset is zero at a center and increases radially from a single common-point (CMP) gather for a plurality of data point, wherein sorting increases radially in a circle or any other continuous pattern/shape.

Clause 3: extracting data from each of the single CMP gather to generate the set of common-offset sections for the plurality of data points. For example, extracting data from each of the single CMP gather to generate a set of two-dimensional (2D) common-offset sections for the plurality of data points, wherein extracting the data may be done along a circle or any other continuous pattern/shape.

Clause 4: generating a multi-dimensional volume by juxtaposing a set of common-offset sections by one of their common-depth point (CDP) and CMP locations, wherein the multi-dimensional volume is one of a three-dimensional (3D) volume and four-dimensional (4D) volume.

Clause 5: selecting reflectors for each layer in the multi-dimensional volume, wherein the selection may be performed manually and/or automatically using any automatic edge detection method such as, but not limited to, predictive painting using plane wave destruction.

Clause 6: computing layer parameters including effective anisotropy and interval anisotropy for each layer in the multi-dimensional volume based on a geometry of the reflectors selected for each layer in the multi-dimensional volume. This function may also include determining maximum and minimum horizontal stresses directions based on the reflectors geometries, as well as natural or hydraulic induced fractures. Also the magnitude of anisotropy caused by either fractures or stress differences is characterized.

Clause 7: applying the layer parameters to an earth model. For example, this function may include generating 3D volumes depicting a horizontal stress anisotropy magnitude and stress direction, as well as vertical fracture density and direction in actual earth coordinates in the 3D earth model.

We claim:

1. A method for characterization of natural and hydraulic fractures and stress using variation in thickness of each layer over an azimuthally anisotropic medium, the method comprising:
receiving reflected seismic waves in at least two directions;
acquiring surface seismic data from the received reflected seismic waves;
sorting the surface seismic data so that offset is zero at a center and increases radially from a single common-point (CMP) gather for a plurality of data points;
generating a multi-dimensional volume by juxtaposing a set of common-offset sections by one of their common-depth point (CDP) and CMP locations, wherein the multi-dimensional volume is one of a three-dimensional (3D) volume and four-dimensional (4D) volume;
selecting reflectors for each layer in the multi-dimensional volume;
computing layer parameters including effective anisotropy and interval anisotropy for each layer in the multi-dimensional volume based on a geometry of the reflectors selected for each layer in the multi-dimensional volume; and
applying the layer parameters to an earth model.

2. The method according to claim 1, wherein the step of acquiring surface seismic data is performed using walk-around vertical seismic profiling (VSP).

3. The method according to claim 1, wherein the step of acquiring surface seismic data is performed using surface seismic profiling.

4. The method according to claim 1, further comprising extracting data from each of the single CMP gather to generate the set of common-offset sections for the plurality of data points.

5. The method according to claim 1, wherein the step of selecting reflectors for each layer in the 3D volume is performed automatically using predictive painting using plane wave destruction.

6. The method according to claim 1, wherein the step of automatically selecting reflectors for each layer in the 3D volume is performed using any automatic edge detection method.

7. The method according to claim 1, wherein the step of computing layer parameters includes determining maximum and minimum horizontal stresses directions based on geometries of the reflectors.

8. The method according to claim 1, wherein the step of applying the layer parameters to the 3D earth model includes generating 3D volumes depicting a horizontal stress anisotropy magnitude and stress direction in actual earth coordinates in the 3D earth model.

9. A system for characterizing fracture and stress using variation in thickness of each layer over an azimuthally anisotropic medium, the system comprising:
- a data storage component for storing data and executable instructions;
- a communication interface configured to receive surface seismic data;
- a processor configured to execute the executable instructions to:
- receive reflected seismic waves in at least two directions;
- acquire surface seismic data from the received reflected seismic waves;
- sort the surface seismic data so that offset is zero at a center and increases radially from a single common-point (CMP) gather for a plurality of data points;
- extract data from each of the single CMP gather to generate a set of two-dimensional (2D) common-offset sections for the plurality of data points;
- generate a three-dimensional (3D) volume by juxtaposing the set of 2D common-offset sections by their common-depth point (CDP) locations;
- select reflectors for each layer in the 3D volume;
- compute layer parameters including effective anisotropy and interval anisotropy for each layer in the 3D volume based on a geometry of the reflectors selected for each layer in the 3D volume; and
- apply the layer parameters to a 3D earth model.

10. The system according to claim 9, wherein the instruction to acquire surface seismic data is performed using walk-around vertical seismic profiling (VSP).

11. The system according to claim 9, wherein the instruction to acquire surface seismic data is performed using surface seismic profiling.

12. The system according to claim 9, wherein the instruction to acquire surface seismic data is performed using any seismic profiling method that is able to capture a thickness of earth layers with variable azimuths.

13. The system according to claim 9, wherein the instruction to select reflectors for each layer in the 3D volume is performed automatically using predictive painting using plane wave destruction.

14. The system according to claim 9, wherein the instruction to select reflectors for each layer in the 3D volume is performed automatically using any automatic edge detection method.

15. The system according to claim 9, wherein the instruction to compute layer parameters includes determining maximum and minimum horizontal stresses and fractures directions based on geometries of the reflectors.

16. The system according to claim 9, wherein the instruction to apply the layer parameters to the 3D earth model includes generating 3D volumes depicting a horizontal stress anisotropy magnitude and stress direction in actual earth coordinates in the 3D earth model.

17. A computer program product, comprising a non-transitory computer usable medium having a computer readable program code embodied therein, said computer readable program code adapted to be executed to:
- receive reflected seismic waves in at least two directions;
- acquire surface seismic data from the received reflected seismic waves;
- sort of the surface seismic data so that offset is zero at a center and increases radially from a single common-point (CMP) gather for a plurality of data points;
- generate a multi-dimensional volume by juxtaposing a set of common-offset sections by their common-depth point (CDP) locations;
- automatically select reflectors for each layer in the multi-dimensional volume; and
- compute layer parameters including effective anisotropy and interval anisotropy for each layer in the multi-dimensional volume based on a geometry of the reflectors selected for each layer in the multi-dimensional volume.

18. The computer program product of claim 17, wherein said computer readable program code is further adapted to be executed to apply the layer parameters to a 3D earth model.

19. The computer program product of claim 17, wherein the computer readable program code to acquire surface seismic data is performed using walk-around vertical seismic profiling (VSP).

20. The computer program product of claim 17, wherein the computer readable program code to apply the layer parameters to the 3D earth model includes generating 3D volumes depicting a horizontal stress anisotropy magnitude and stress direction in actual earth coordinates in the 3D earth model.

* * * * *